Dec. 26, 1939.    A. GACIOPPO    2,185,127

SHOCK ABSORBER

Filed May 17, 1938

Inventor,
Alfonso Gacioppo
By: Glascock Downing & Seebold
Attys.

Patented Dec. 26, 1939

2,185,127

UNITED STATES PATENT OFFICE 2,185,127

SHOCK ABSORBER

Alfonso Gacioppo, Tucuman, Argentina

Application May 17, 1938, Serial No. 208,460
In Argentina August 12, 1937

2 Claims. (Cl. 267—9)

The present invention relates to shock absorbers and more particularly pertains to such devices for use in connection with motor vehicles.

One of the objects of the invention resides in providing means for dampening vibrations wherein a shaft is rotatably mounted within a casing having means therein for snubbing rotation of the shaft with respect to the casing.

Other and further objects and features of the invention will be more apparent to those skilled in the art upon a consideration of the accompanying drawing and the following description wherein an exemplary embodiment of the invention is disclosed.

Figure 1:
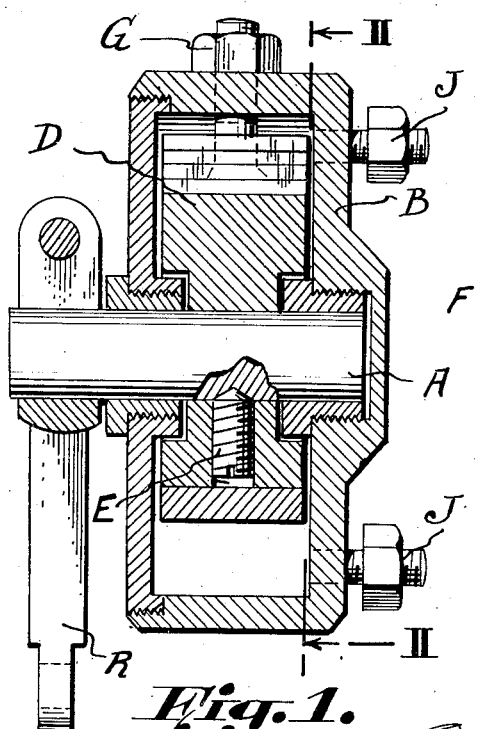
Fig. 1 is an axial sectional view of the shock absorber taken on the line I—I of Fig. 2.

Referring to the drawing there is shown at A a shaft rotatably mounted within the casing B. The shaft is provided with an arm R which may be attached to the chassis or the axle of a motor vehicle. The casing B is provided with a plurality of bolts J so that the casing may be fixed to the other relatively movable part of the motor vehicle.

An arcuate shaped member D is secured to the shaft within the casing by means of a set screw E. The arcuate shaped member D is provided with a peripheral surface which is eccentrically arranged with respect to the shaft A.

Figure 2:
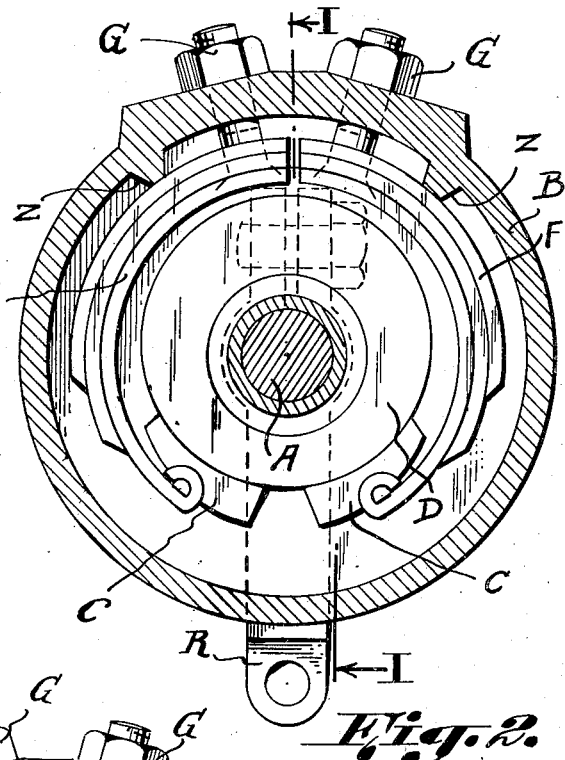
Fig. 2 is a sectional view of the casing taken on the line II—II of Fig. 1 and illustrating the eccentric and the yieldable braking means in elevation.
Figure 3:
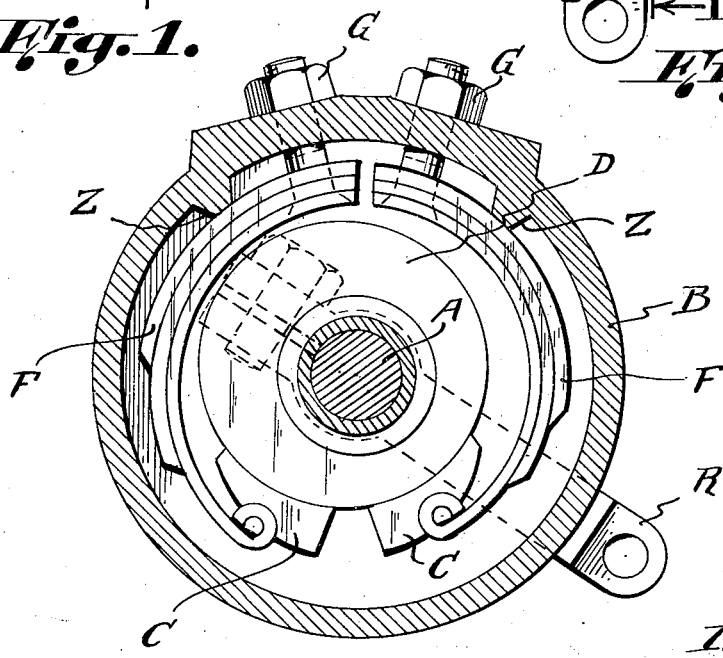
Fig. 3 is a sectional view similar to Fig. 2 showing the position of the eccentric when the shaft has been rotated with respect to the casing.

The casing B is provided with a pair of inwardly projecting abutments Z as shown particularly in Figs. 2 and 3. These abutments are provided for being engaged by leaf springs F. One end of each leaf spring carries a brake shoe C and the opposite ends of the leaf springs are adapted to be moved radially outward by means of bolts G which pass through openings in the casing. These bolts are provided with nuts which may be adjusted outside of the casing to move the associated ends of the leaf springs in radial directions so as to cause the springs to engage the abutments Z and urge the brake shoes C into engagement with the periphery of the arcuate shaped member D.

The normal position of the eccentric shaped member is illustrated in Fig. 2 with the brake shoes C engaging that part of the peripheral surface of the arcuate shaped member D which is nearest the axis of the shaft A. Thus when the casing B is rotated with respect to the shaft A as illustrated in Fig. 3 the brake shoes are urged radially outward to provide more friction between the periphery of the eccentric and the brake shoes. Turning of the shaft with respect to the casing is therefore opposed by increased friction between the brake shoes and the eccentric to provide means for snubbing movement of the axle of a motor car with respect to the chassis when the arm R is fixed to the axle and the casing B secured to the chassis.

Adjustable means are provided for varying the snubbing action in that the nuts on the bolts G can be adjusted to increase and decrease the pressure of the brake shoes against the periphery of the arcuate member. In other words the abutments Z will cause the brake shoes C to be moved against the periphery of the arcuate shaped member when the bolts G are moved radially outward.

While the invention has been described with reference to specific constructional details it will be appreciated that changes may be made therein. Such modifications may be made without departing from the spirit and scope of the invention as set forth in the appended claims.

I claim:

1. In a shock absorber, a casing, a shaft adapted to be rotated within the casing, an arcuate-shaped member movable within the casing and secured to the shaft, said member having a peripheral surface eccentrically arranged with respect to the axis of the shaft, a fixed abutment projecting inwardly from the casing, a leaf-spring engaging said abutment, a brake shoe carried by the leaf-spring adjacent one end thereof and engaging the periphery of said member, and adjustable means associated with the opposite end of said leaf-spring for urging said brake shoe against the periphery of said member.

2. In a shock absorber, a cylindrical shaped casing, a shaft arranged axially of the casing and rotatable with respect thereto, an arcuate-shaped member arranged within the casing and fixed on said shaft, said member having a peripheral surface extending eccentrically with respect to the axis of the shaft, two fixed abutments projecting radially inward from the casing, a leaf-spring engaging each abutment, a brake shoe carried adjacent one end of each leaf-spring and normally engaging a portion of the periphery of said member nearest said shaft, and adjustable means associated with the opposite ends of said leaf-springs for urging said brake shoes against the periphery of said member.

ALFONSO GACIOPPO.